(12) United States Patent
Lindholm et al.

(10) Patent No.: US 7,109,999 B1
(45) Date of Patent: Sep. 19, 2006

(54) METHOD AND SYSTEM FOR IMPLEMENTING PROGRAMMABLE TEXTURE LOOKUPS FROM TEXTURE COORDINATE SETS

(75) Inventors: John Erik Lindholm, Saratoga, CA (US); Harold Robert Feldman Zatz, Palo Alto, CA (US); Walter E. Donovan, Saratoga, CA (US); Matthew N. Papakipos, Palo Alto, CA (US)

(73) Assignee: nVidia Corporation, Santa Clara, CA (US)

( * ) Notice: Subject to any disclaimer, the term of this patent is extended or adjusted under 35 U.S.C. 154(b) by 24 days.

(21) Appl. No.: 10/449,322

(22) Filed: May 29, 2003

(51) Int. Cl.
  *G09G 5/00* (2006.01)
  *G06F 12/06* (2006.01)
(52) U.S. Cl. ...................... 345/582; 345/572
(58) Field of Classification Search ................ 345/582, 345/583, 584, 586, 587, 501, 506, 552, 572
See application file for complete search history.

(56) References Cited

U.S. PATENT DOCUMENTS 6,700,581 B1 * 3/2004 Baldwin et al. ............ 345/519

* cited by examiner

*Primary Examiner*—Kee M Tung
*Assistant Examiner*—Aaron M. Richer (57) ABSTRACT

A method and system for implementing programmable texture lookups from texture coordinate sets. The method includes the step of generating a plurality of texture coordinates using a shader module. The shader module executes floating point calculations on received pixel data to generate the texture coordinates. A plurality of texture values are fetched using the texture coordinates. The fetching is performed by a texture unit coupled to receive the texture coordinates from the shader module. The fetching of the texture values is programmable with respect to the texture coordinates such that the number of texture coordinates are decoupled from the number of textures.

20 Claims, 7 Drawing Sheets

METHOD AND SYSTEM FOR IMPLEMENTING PROGRAMMABLE TEXTURE LOOKUPS FROM TEXTURE COORDINATE SETS

FIELD OF THE INVENTION

The field of the present invention relates to computer graphics. More particularly, the present invention relates to texture operations in a computer graphics processing pipeline.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. Texture mapping is a relatively efficient technique for creating the appearance of a complex image without the tedium and the high computational cost of rendering the actual three dimensional detail that might be found on a surface of an object.

Figure 1:
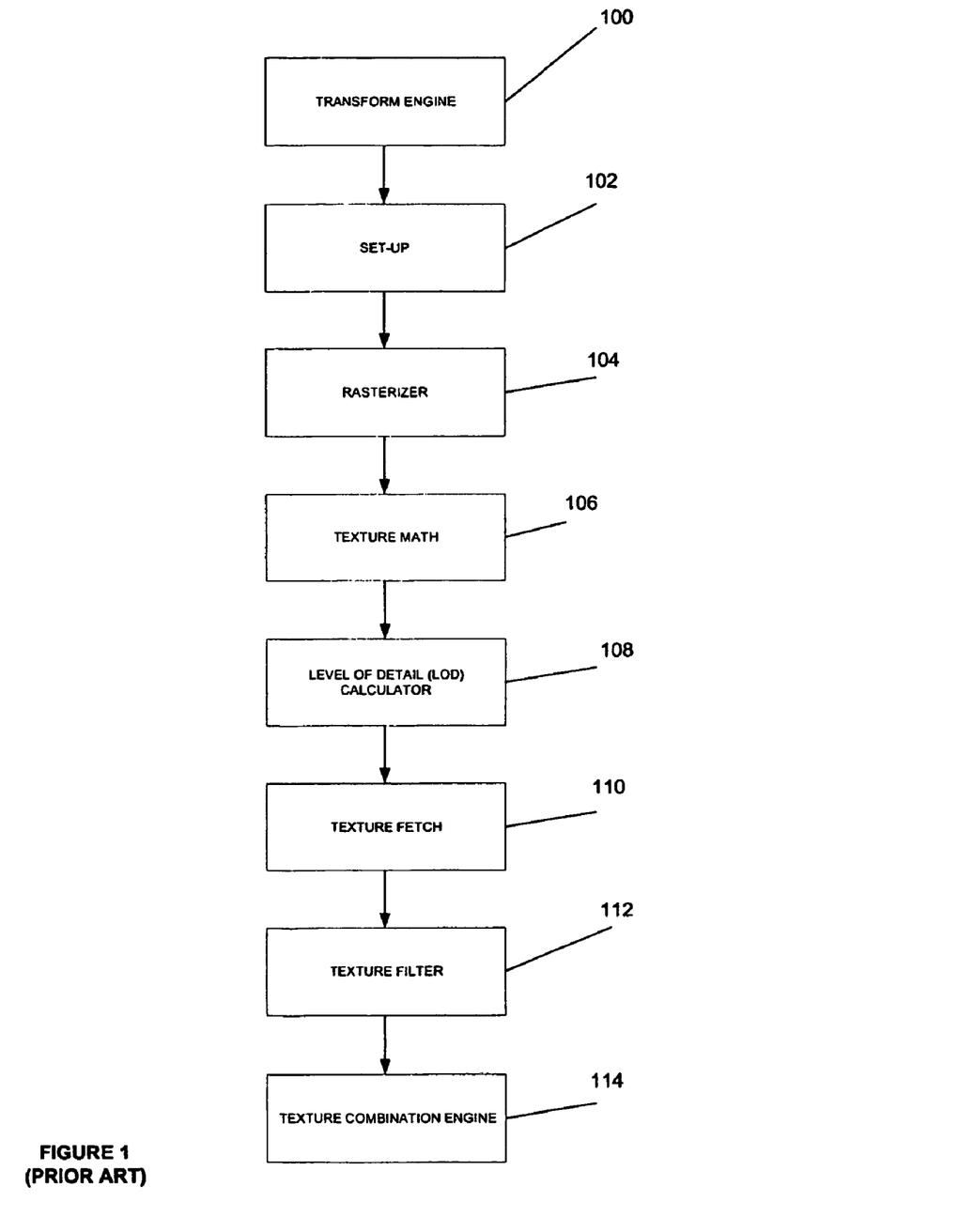
FIG. 1 shows a typical prior art graphics pipeline for performing texture mapping operations.

Prior Art FIG. 1 illustrates a graphics pipeline with which texture mapping may be performed. As shown, included is a transform engine 100, a set-up module 102, a rasterizer 104, a texture math module 106, a level of detail (LOD) calculator 108, a texture fetch module 110, a texture filter 112 and a texture combination engine 114. It should be noted that the transform engine 100 and set-up module 102 need not necessarily be required in the graphics pipeline of a graphics integrated circuit.

Figure 2:
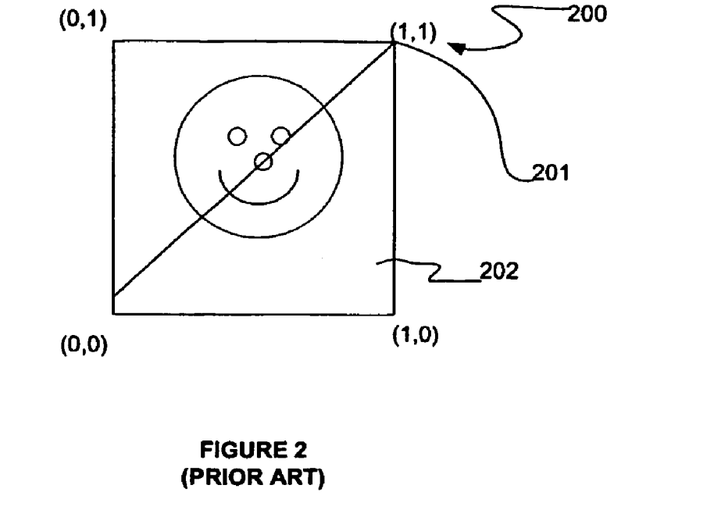
FIG. 2 shows the coordinates of the vertices, which define a triangle.

During operation, the transform engine 100 may be used to perform scaling, rotation, and projection of a set of three dimensional vertices from their local or model coordinates to the two dimensional window that will be used to display the rendered object. The setup module 102 utilizes the world space coordinates provided for each triangle to determine the two dimensional coordinates at which those vertices are to appear on the two dimensional window. Prior Art FIG. 2 illustrates the coordinates 200 of the vertices 201 which define a triangle 202. If the vertices 201 of the triangle 202 are known in screen space, the pixel positions vary along scan lines within the triangle 202 in screen space and may be determined.

Figure 2A:
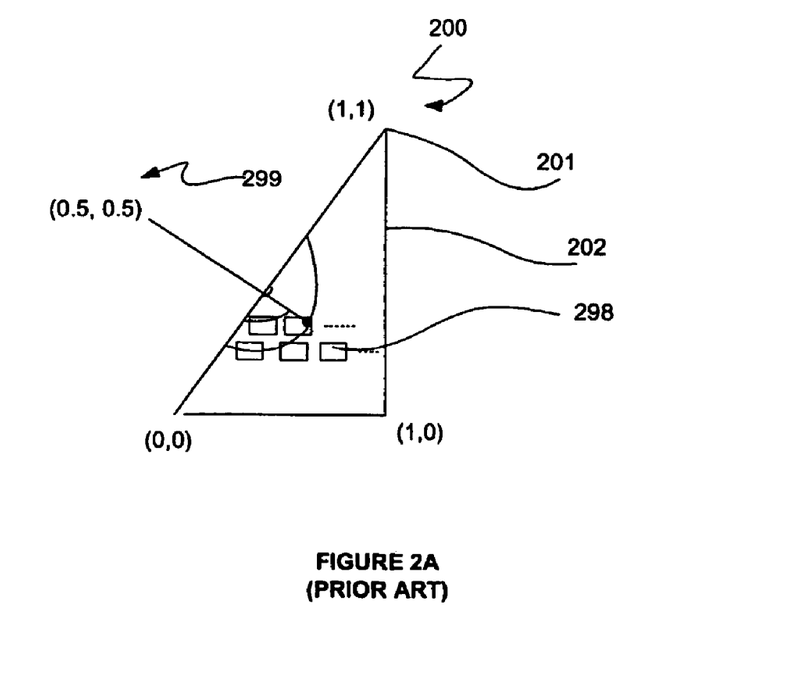
FIG. 2A shows a plurality of pixels identified within the triangle of FIG. 2.

The setup module 102 and the rasterizer module 104 together use the three dimensional world coordinates to determine the position of each pixel contained inside each of the triangles. Prior Art FIG. 2A illustrates a plurality of pixels 298 identified within the triangle 202 in such a manner. The color values of the pixels in the triangle 202 vary from pixel to pixel in world space. During use, the setup module 102 and the rasterizer module 104 generate interpolated colors, depth and texture coordinates. The setup module 102 and the rasterizer module 104 then feed the pixel texture coordinates to the texture math module 106 to determine the appropriate texture map colors. In particular, texture coordinates are generated that reference a texture map using texture coordinate interpolation which is commonly known to those of ordinary skill in the art. This is done for each of the pixels 298 identified in the triangle 202. Prior Art FIG. 2A illustrates texture coordinates 299 for the pixels 298 identified within the triangle 202.

Next, a LOD calculation is performed by the LOD calculator 108. Generally, a level of detail (LOD) calculation is used to determine whether a displayed image will be a magnified or minified representation of the texture map. For example, in some occasions, one texel, or texture element, will correspond directly to a single pixel that is displayed on a monitor, where the texel is neither magnified nor minified. In other occasions, the texture map is magnified, where multiple pixels will represent a single texel, or minified, where a single pixel represents multiple texels.

After the LOD calculation, the texture coordinates generated by the texture math module 106 are used to fetch the appropriate texture map colors using the texture fetch module 110. These texture map colors are then filtered by the texture filter module 112. The combiner engine 114 combines together the various colors and textures fetched by the texture fetch module 110 and filtered by the texture filter module 112.

A problem exists with the prior art rendering pipeline described above, with respect to the fact that the hardware of the pipeline is optimized to support an essentially linear topology. Prior art type linear pipelines, and other simplistic non-linear pipelines, tightly couple texture fetch operations with the texture calculation operations. For example, in a given rendering pass, one texture calculation (e.g., texture coordinate calculation) is used to fetch one corresponding texture. Even with parallel texture calculation and fetches, the texture calculations are tightly coupled with their corresponding texture fetches (e.g., 4 texture calculations are directly tied to their corresponding 4 texture fetches. This is a limited design that is static in nature. Since a large amount of state data is associated with the texture calculations, such limited static designs do not scale efficiently.

Thus, there exists a need for a pipeline that allows for more dynamic texture fetches and shading calculations, and in particular, the ability for increasing the number of texture fetch operations that can be performed without an expensive, redundant build up in the amount of texture calculation state data that must be maintained. The present invention provides a novel solution to the above needs.

SUMMARY OF THE INVENTION

Embodiments of the present invention provided a method and system for implementing programmable texture lookups from texture coordinate sets. Embodiments of the present invention implement a graphics rendering pipeline that allows for more dynamic texture fetches and shading calculations, including the ability for increasing the number of texture fetch operations that can be performed without an expensive, redundant build up in the amount of texture calculation state data that must be maintained.

In one embodiment, the present invention is implemented as a method for generating a plurality of texture coordinates using a shader module of a graphics rendering pipeline. The shader module executes floating point calculations on received pixel data to generate the texture coordinates. The texture coordinates are passed to a texture unit coupled to the shader module. A plurality of texture values are fetched using the texture coordinates. The fetching of the texture values is programmable with respect to the texture coordinates, thereby decoupling the actual fetching of the texture values from the manner and order in which the texture coordinates are received from the shader module.

In one embodiment, the shader module and the texture unit are implemented within a programmable pixel shader. The decoupling of the actual fetching of the texture values from the received texture coordinates enables programmable flexibility in the manner in which the texture values are fetched from memory. Texture coordinate sets can be reused to fetch from different textures. For example, two different textures could be looked up with the same interpolated texture coordinate set. The number of textures looked up and texture coordinate sets provided become independent of each other.

In this manner, the programmable texture lookups enable more dynamic texture fetches and shading calculations. By increasing the number of texture fetch operations that can be performed from a given number of texture coordinate sets, the texture operations of a graphics rendering pipeline can be increased without an expensive, redundant build up in the amount of texture calculation state data (e.g., multiple copies of texture coordinate set data, and the like) that must be maintained.

BRIEF DESCRIPTION OF THE DRAWINGS

The present invention is illustrated by way of example, and not by way of limitation, in the figures of the accompanying drawings and in which like reference numerals refer to similar elements.

Prior Art

Prior Art

Prior Art

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provided a method and system for implementing programmable texture lookups from texture coordinate sets. Embodiments of the present invention implement a graphics rendering pipeline that allows for more dynamic texture fetches and shading calculations, including the ability for increasing the number of texture fetch operations that can be performed without an expensive, redundant build up in the amount of texture calculation state data that must be maintained. Embodiments of the present invention and their benefits are further described below.

Figure 3:
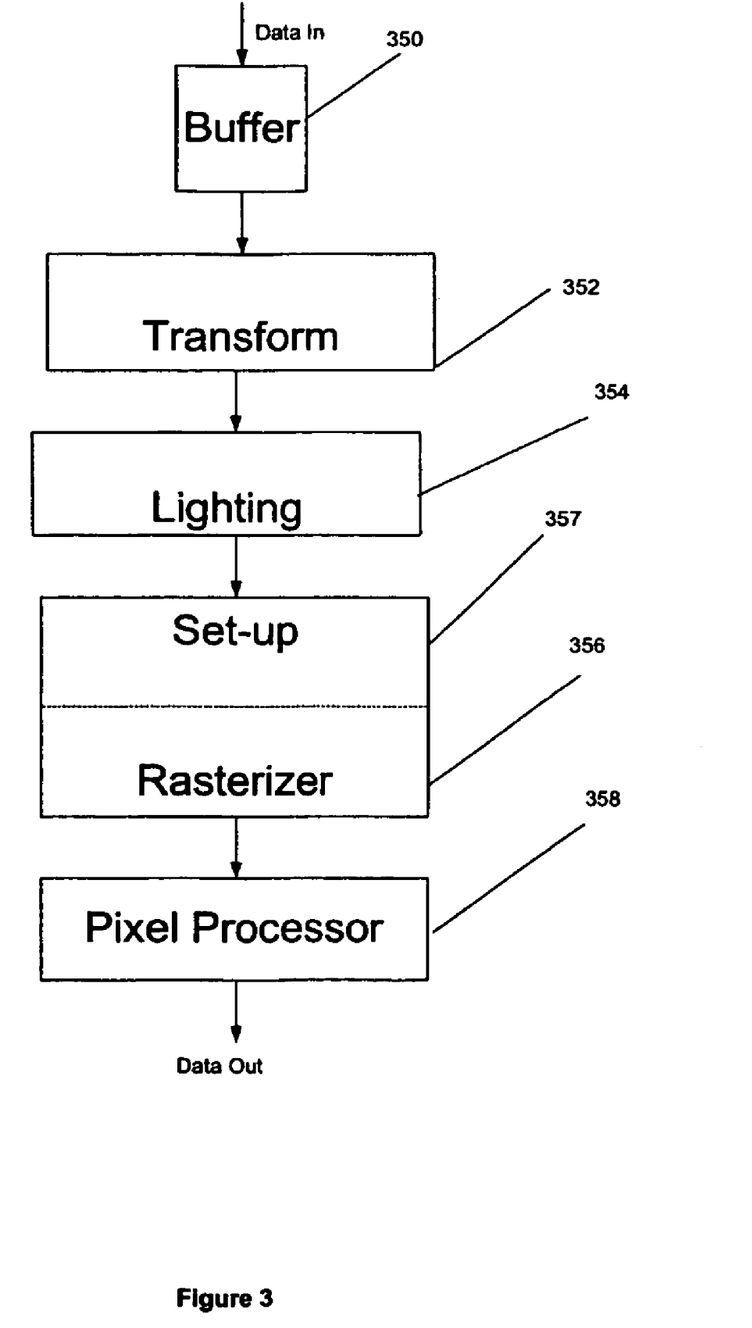
FIG. 3 shows a diagram depicting the various components of a graphics pipeline in accordance with one embodiment of the present invention.

FIG. 3 is a schematic diagram illustrating a graphics pipeline in accordance with one embodiment of the present invention. As shown, the present embodiment involves a plurality of modules including an attribute buffer 350, a transform module 352, a lighting module 354, a rasterization module 356 with a set-up module 357, and a pixel processing module 358.

As an option, each of the foregoing modules may be situated on a single semiconductor platform. As used herein, the single semiconductor platform may refer to a sole unitary semiconductor-based integrated circuit or chip. It should be noted that the term single semiconductor platform may also refer to multi-chip modules with increased connectivity that simulate on-chip operation, and make substantial improvements over utilizing a conventional CPU and bus implementation. The single semiconductor platform can be, for example, a desktop computer system or server computer system, having a powerful general-purpose CPU coupled to a dedicated GPU (graphics processor unit). Similarly, the single semiconductor platform can be implemented as a video game console device such as, for example, as the Xbox®, available from Microsoft Corporation of Redmond, Wash. Additionally, it should be noted that embodiments of present invention may also be implemented on multiple semiconductor platforms and/or utilizing a conventional CPU and bus implementation.

During operation, the buffer 350 is included for gathering and maintaining a plurality of attributes. Completed vertices are processed by the transform module 352 and then sent to the lighting module 354. The transform module 352 generates vectors for the lighting module 354 to light. The output of the lighting module 354 is screen space data suitable for the set-up module that, in turn, sets up primitives. Thereafter, rasterization module 356 carries out rasterization of the primitives. In particular, the rasterization module 356 passes on pixel data including, but not limited to a position, a pixel diffuse color, a specular color, a fog distance, a plurality of texture coordinates, and/or any other information relating to the pixels involved with the processing in the graphics pipeline.

A pixel processing module 358 is coupled to the rasterization module 356 for processing the pixel data. The pixel processing module 358 begins by reading the pixel data generated by the rasterization module 356. In operation, the pixel processing module 358 outputs a color and a depth value, e.g., a "z" value.

Figure 4:
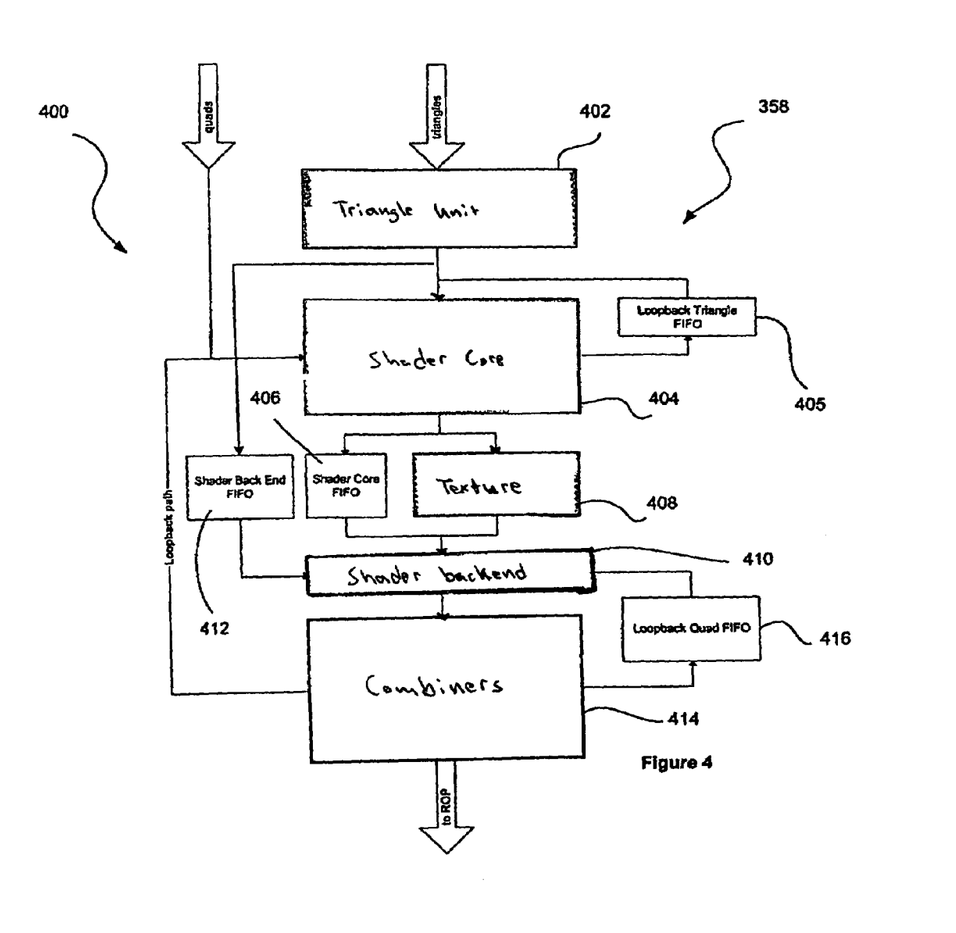
FIG. 4 shows a diagram depicting the various components of the pixel processing module of FIG. 3 in accordance with one embodiment of the present invention.

FIG. 4 is a schematic diagram of the various components 400 of the pixel processing module 358 of FIG. 3. Included is a triangle unit 402 coupled to the rasterizer 356 of FIG. 3 for receiving the pixel data therefrom. Ideally, the pixel data is received for each vertex of a polygon, e.g., a triangle. It should be noted that the rasterizer 356 also identifies a pixel on the screen that is most likely to be coincident with the polygon, e.g., triangle, being processed.

In use, the triangle unit 402 calculates plane equations at different levels of precision using the pixel data, and further identifies a point of origin of the plane equations. The plane equations are each adapted for describing a value of various pixel data parameters associated with a particular polygon.

Also provided is a shader module, shader core module 404, coupled to the triangle unit 402 and the rasterizer 356 for receiving the plane equations and origin from the triangle unit 402 and the pixel data from the rasterizer 356. In use, the shader core module 404 outputs interpolated values while performing shading operations using the pixel data and the plane equations, executes floating point calculations, and generates texture coordinates.

In the present embodiment, a loopback triangle buffer 405 is coupled between an input and an output of the shader core module 404 for feeding back the interpolated values for further use in the calculations.

Referring still to FIG. 4, a texture unit 408 is provided to implement programmable texture lookups from texture coordinates received from the shader core module 404. The programmable texture lookups as performed by the texture unit 408 implement a graphics rendering pipeline that allows for more dynamic texture fetches and shading calculations, including the ability for increasing the number of texture fetch operations that can be performed without an expensive, redundant build up in the amount of texture calculation state data (e.g., multiple copies of texture coordinate set data, and the like) that must be maintained.

As depicted in FIG. 4, the texture unit 408 is coupled to an output of the shader core module 404 as shown. In the present embodiment, a shader core FIFO buffer 406 is also coupled to the output of the shader core module 404. In use, the shader core FIFO buffer 406 stores the output of the floating point calculations generated by the shader core module 404 for later use while the texture coordinates are being processed by the texture unit 408. In operation, the texture unit 408 uses the texture coordinates generated by the shader core module 404 for performing the programmable texture value fetching.

Next included is a shader back end module 410 with an input coupled to an output of the shader core FIFO buffer 406 and the texture unit 408, and a shader back end FIFO 412. The shader back end FIFO 412 is further coupled to an output of the triangle unit 402 for temporarily storing the plane equations for use by the shader back end module 410. In use, the shader back end module 410 serves to convert the texture values to an appropriate floating point representation, and perform color interpolation to generate color values.

A combiner module 414 is coupled to the shader back end module 410 for receiving the color and texture values and combining the same in any desired proportion. The combiner module 414 may be configured in any manner well known to those of ordinary skill.

More information regarding the exemplary operation of a graphics pipeline compatible with embodiments of the present invention can be found in commonly assigned U.S. patent applications "PROGRAMMABLE PIXEL SHADING ARCHITECTURE" Ser. No. 09/885,242, filed on Jun. 19, 2001, and "SYSTEM, METHOD AND COMPUTER PROGRAM PRODUCT FOR A PROGRAMMABLE PIXEL PROCESSING MODEL WITH INSTRUCTION SET" Ser. No. 09/885,382, filed on Jun. 19, 2001, which are incorporated herein by reference in their entirety.

Figure 5:
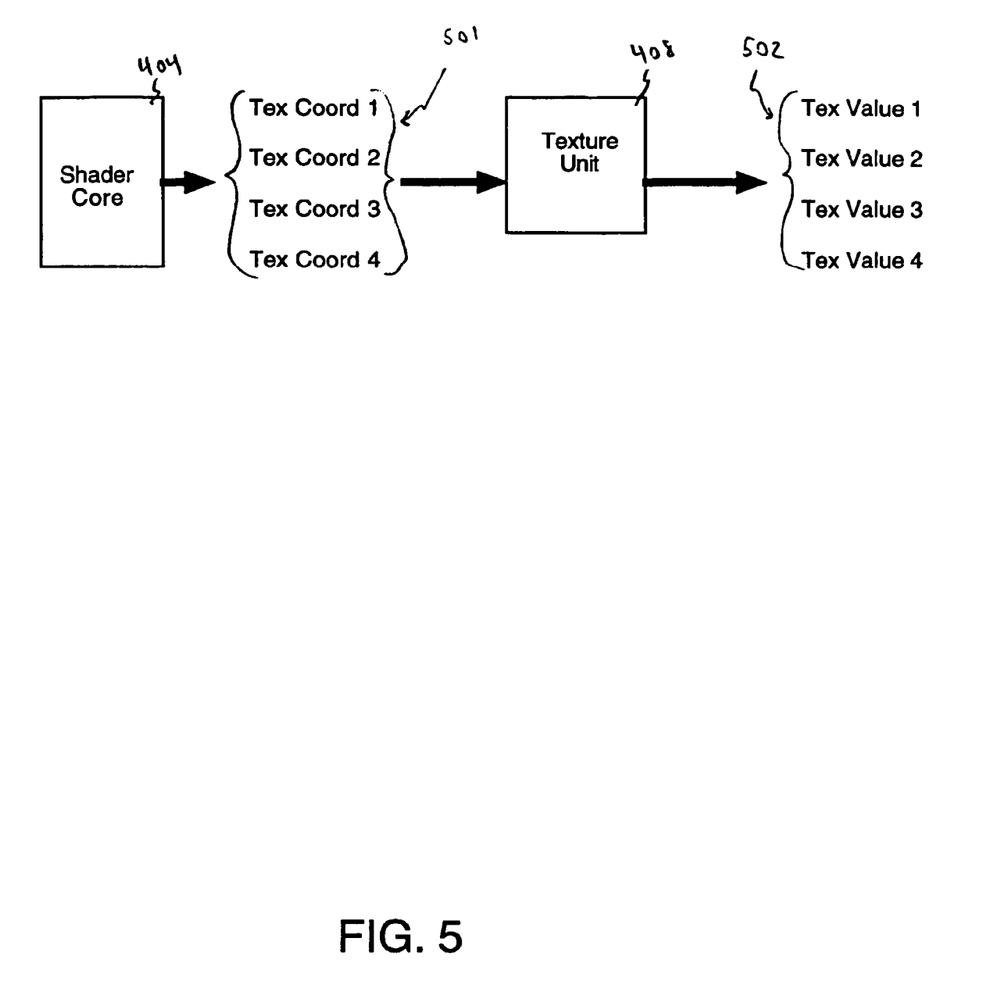
FIG. 5 shows a diagram depicting the operation of a texture unit wherein a plurality of texture values are programmably fetched using a plurality of texture coordinates in accordance with one embodiment of the present invention.

FIG. 5 shows a diagram depicting the operation of the texture unit 408 wherein a plurality of texture values 502 are fetched using a plurality of texture coordinates 501.

In the present embodiment, as described above, a plurality of texture coordinates are generated using the shader core 404. The shader core 404 executes the floating point calculations on received pixel data in order to generate the texture coordinates 501 depicted in FIG. 5. The texture coordinates 501 are passed to the texture unit 408 coupled to the shader core 404. The texture unit 408 then functions by determining the texture values 502 using the texture coordinates. However, in accordance with present embodiment, the fetching of the texture values 502 is programmable with respect to the received texture coordinates 501. The fetching of the texture values 502 is, in effect, decoupled from the manner and order in which the texture coordinates 501 are received from the shader core 404. This relationship is shown in greater detail in FIG. 6 below.

Figure 6:
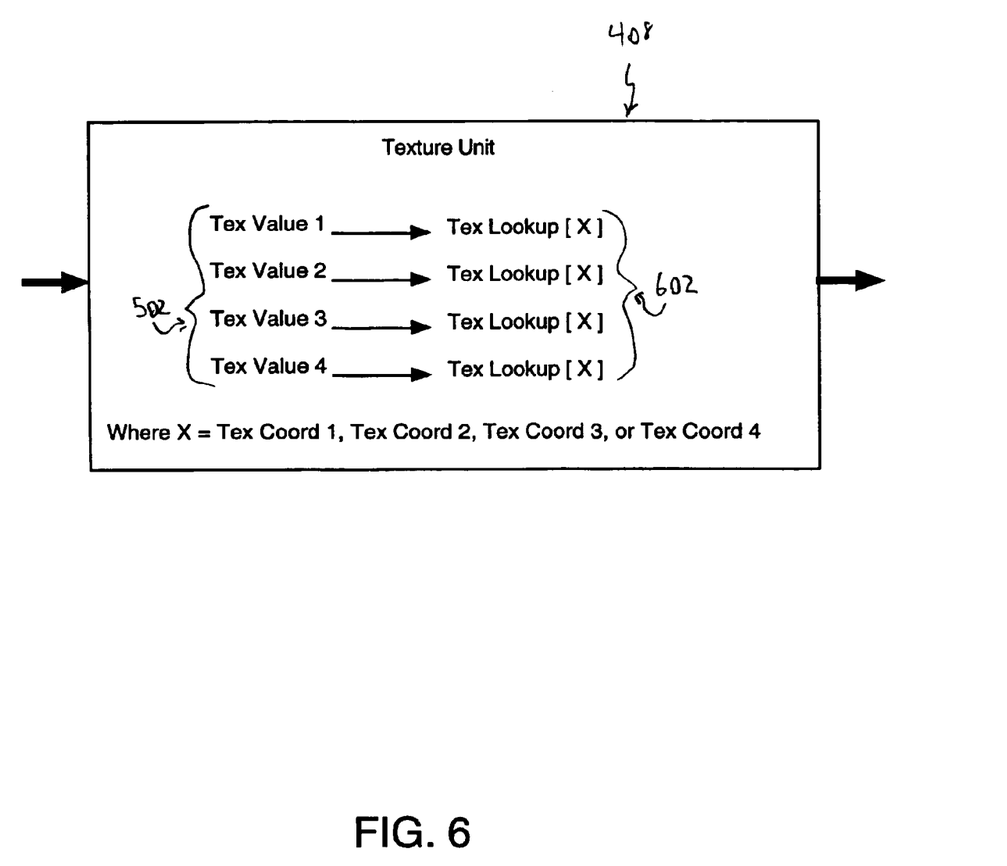
FIG. 6 shows a diagram depicting a programmable texture fetch operation as implemented by the texture unit of FIG. 5 in accordance with one embodiment of the present invention.

FIG. 6 shows a diagram depicting a texture fetch operation as implemented by the texture unit 408 in accordance with one embodiment of the present invention. As described above, the fetching of the texture values 502 is, in effect, decoupled from the manner and order in which the texture coordinates 501 are received from the shader core 404. This is shown in FIG. 6 where the texture values 502 are determined based upon a programmable relationship, wherein the operand, or the specific coordinate with which the texture lookup will be performed, can be specified by a user application, program, or the like. For example, as shown in FIG. 6, the value for the texture values 502 (e.g., texture value 1, texture value 2, etc.) is determined by specifying the operand "X" where X can be designated as any of the incoming texture coordinates 501 (e.g., texture coordinate 1, texture coordinate 2, etc.) shown in FIG. 5. In this manner, each of the output texture values 502 can be specified to be from a texture lookup based upon any of the incoming texture coordinates 501.

The programmable texture lookups as depicted in FIG. 6 enable more dynamic texture fetches. For example, a 16-way texture fetch can be implemented using 8 texture coordinate sets using the texture unit 408. Similarly, a 16-way texture fetch can be implemented using 4 texture coordinates. The decoupled relationship allows one texture coordinate to be used for multiple texture value fetches, and thus, multiple texture values output from the texture unit 408. Instead of sending redundant texture coordinates 2, 3, 10 times, or the like, the specific operand can be specified for each texture fetch for the resulting texture value output as described above. This enables the texture operations of a graphics rendering pipeline to be increased without an expensive, redundant build up in the amount of texture calculation state data that must be maintained. In one embodiment, a 16-way texture fetch is implemented using from 1 to 8 coordinates. Accordingly, it should be noted that embodiments of the present invention are not limited to any specific number of texture coordinates or texture maps. The "many-to-many" relationship between texture coordinates and texture maps of embodiments of the present invention is shown in greater detail in FIG. 7 below.

Figure 7:
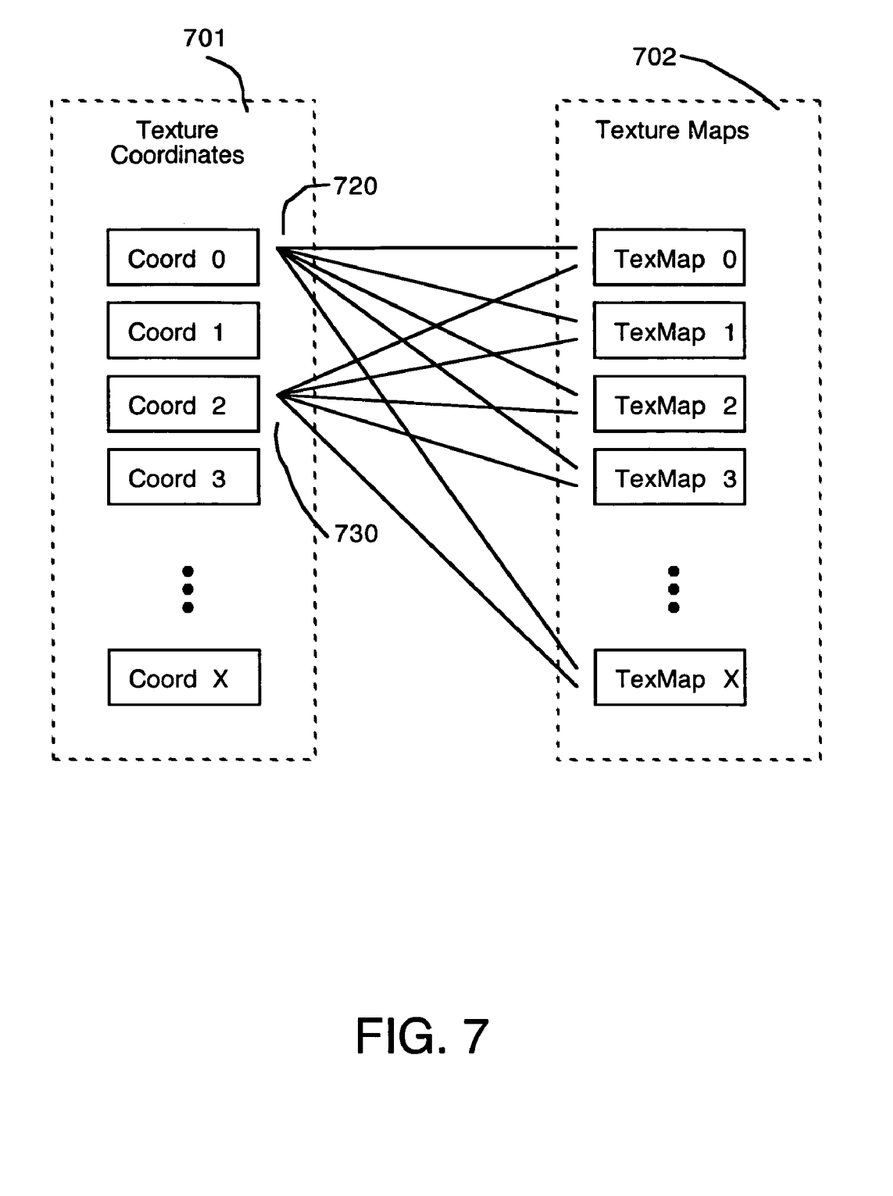
FIG. 7 shows a diagram depicting a many-to-many relationship between a set of texture coordinates and a set of texture values in accordance with one embodiment of the present invention.

FIG. 7 shows a diagram illustrating the many-to-many relationship between texture coordinates and texture maps in a texture fetch operation as implemented by the texture unit 408 in accordance with one embodiment of the present invention.

As depicted in FIG. 7, a set of texture coordinates 701 and a set of texture maps 702 are shown. The set of texture coordinates 701 comprises a plurality of texture coordinates, numbered sequentially Coord 0 through Coord X, as shown. The set of texture maps 702 comprises a plurality of texture maps, numbered sequentially TexMap 0 through TexMap X, as shown. Embodiments of the present invention are not limited to any particular number of texture coordinates or any particular number of texture maps. Accordingly, "Coord X" can be Coord 6, Coord 8, Coord 16, Coord 17, or the like (e.g., where X is a variable that can be increased or decreased depending upon the desired scale of the implementation). Similarly, "TexMap X" can be TexMap 8, TexMap 17, TexMap 24, or the like.

FIG. 7 shows the many-to-many relationship between the texture coordinates 701 and the texture maps 702. In the present embodiment, the fetching of texture values from the texture maps is programmable with respect to the manner and order in which the texture coordinates 501 are received from the shader core 404. In this embodiment, any of the coordinates 501 can be used with any of the texture maps 702. Depending upon the specific implementation of the texture unit 408, the texture coordinates 701 are respectively stored in registers within the texture unit 408, and the texture maps 702 are stored within graphics memory. FIG. 7 graphically depicts an example where any one of TexMap 0 through TexMap X can be used with any one of Coord 0 through Coord X for a texture fetch operation. FIG. 7 shows texture fetch operations for Coord 0 and Coord 2 as examples. Coord 0 is able to use any one of TexMap 0 through TexMap X, as shown by the lines 720 to fetch a texture value. Similarly, Coord 2 is able to use any one of TexMap 0 through TexMap X, as shown by the lines 730. This relationship holds for each of the coordinates 701. Hence, a given texture map can be used with a texture coordinate one time, many times (e.g., as many as X number of times), or not at all, as determined by the programmed relationship provided by an implementer (e.g., a graphics programmer).

In one embodiment, texture fetches are implemented using texture coordinates that are generated by an arbitrary shader program as opposed to, for example, texture coordinates interpolated across the area of a polygon. Additionally, in one embodiment, interpolated texture coordinates can be mixed with arbitrary texture coordinates (e.g., generated by a shader program) for the texture fetch operations. This capability provides an added degree of flexibility for the graphics programmer. Additional descriptions of the use of arbitrary texture coordinates and the generation of arbitrary texture coordinates by shader programs can be found in commonly assigned U.S. patent application "SYSTEM, METHOD AND COMPUTER PROGRAM PRODUCT FOR USING AN ARBITRARY QUANTITY AS TEXTURE ADDRESS" filed May 23, 2003, Ser. No. 10/444,418, which is incorporated herein in its entirety.

An example syntax of a programmable texture fetch operation in accordance with one embodiment of the present invention is now described. It should be noted that the instruction syntax described below is exemplary. As such, any specific syntax form can change in accordance with, for example, system architecture changes, application programming interface version updates, and the like. In one embodiment, the texture fetch operation has the general syntax "Texture Fetch (TEX, TXP, TXD)" and the format is as shown below.

Format:

TEX[c] D[.xyzw][(RC[.xyzw])],[−]S0[.xyzw],#tid

TXP[c] D[.xyzw][(RC[.xyzw])],[−]S0[.xyzw],#tid

TXD[c]   D[.xyzw]   [(RC[.xyzw])],[−]S0[.xyzw],[−]S1[.xyzw], [−]S2[.xyzw],#tid

The contents of the source vector are used as a texture coordinate indexing into the specified (via tid: 0–15) texture map. The filtered vector resulting is placed into the destination as a quad-float. TEX generates a texture fetch of (x,y,z) while TXP generates a texture fetch of (x/w,y/w,z/w). TXD allows specification of the derivative in x (S1) and y (S2). These may be used for LOD/anisotropic calculations. TXD generates a texture fetch of (x,y,z).

The following table sets forth an example of operation associated with the TEX, TXP, and TXD instructions.

t.x=source0.c***; /*c is x yro y or z or w*/
t.y=source0.c**;
t.z=source0.***c;
t.w=source0***c;
if(-source0)
t=-t;
q=TextureFetch (t, texid);
if(destination.x)R.x=q.x;
if(destination.y)R.y=q.y;
if(destination.z)R.z=q.z;
if(destination.w)R.w=q.w;

Example:
TEX R2, R3, #3 //Fetch from texture 3 using R3 as coords.

Thus, embodiments of the present invention provided a method and system for implementing programmable texture lookups from texture coordinate sets. Embodiments of the present invention implement a graphics rendering pipeline that allows for more dynamic texture fetches and shading calculations, including the ability for increasing the number of texture fetch operations that can be performed without an expensive, redundant build up in the amount of texture calculation state data that must be maintained.

What is claimed is:

1. A system for using a shader to implement programmable texture lookups from texture coordinate sets, comprising:
a shader module for receiving the pixel data, the shader capable of executing calculations and generating a plurality of texture coordinates using the pixel data; and
a texture unit coupled to the shader module to receive the texture coordinates, the texture unit capable of fetching a plurality of texture values from a plurality of different textures by using the texture coordinates, wherein the fetching of the texture values is programmable with respect to the texture coordinates, and wherein the texture unit is capable of implementing at least a 16-way texture fetch using at least 1 to 8 texture coordinates received from the shader module.

2. The system of claim 1, wherein the texture unit is capable of fetching the texture values using the texture coordinates, wherein the fetching of the texture values is decoupled from the receiving of the texture coordinates.

3. The system of claim 1, wherein the shader module and the texture unit are implemented within a programmable pixel shader.

4. The system of claim 1 wherein the texture unit is configured to access a set of texture coordinates and a set of texture maps, where each texture coordinate of the set of texture coordinates can use any one texture map of the set of texture maps for a texture fetch.

5. A method for implementing programmable texture lookups from texture coordinate sets, comprising:
   generating a plurality of texture coordinates using a shader module, the shader module executing floating point calculations on received pixel data to generate the texture coordinates; and
   fetching a plurality of texture values from a plurality of different textures by using the texture coordinates, the fetching performed by a texture unit coupled to receive the texture coordinates from the shader module, wherein the fetching of the texture values is programmable with respect to the texture coordinates and wherein the texture unit is capable of implementing at least a 16-way texture fetch using at least 1 to 8 texture coordinates received from the shader module.

6. The method of claim 5, wherein the texture unit is capable of fetching the texture values using the texture coordinates, wherein the fetching of the texture values is decoupled from the receiving of the texture coordinates.

7. The method of claim 5, wherein the shader module and the texture unit are implemented within a programmable pixel shader.

8. The method of claim 5, further comprising:
   using the texture unit to access a set of texture coordinates and a set of texture maps, where each texture coordinate of the set of texture coordinates can use any one texture map of the set of texture maps for a texture fetch.

9. A computer readable Media for implementing programmable texture lookups from texture coordinate sets, the media having computer readable code which when executed by a graphics pipeline of a computer system cause the pipeline to implement a method comprising:
   generating a plurality of texture coordinates using a shader module, the shader module executing floating point calculations on received pixel data to generate the texture coordinates; and
   fetching a plurality of texture values from a plurality of different textures by using the texture coordinates, the fetching performed by a texture unit coupled to receive the texture coordinates from the shader module, wherein the fetching of the texture values is programmable with respect to the texture coordinates, and wherein the texture unit is capable of implementing at least a 16-way texture fetch using at least 1 to 8 texture coordinates received from the shader module.

10. The computer readable media of claim 9, wherein the texture unit is capable of fetching the texture values using the texture coordinates, wherein the fetching of the texture values is decoupled from the receiving of the texture coordinates.

11. The computer readable media of claim 9, wherein shader module and the texture unit are implemented within a programmable pixel shader.

12. The computer readable media of claim 9 wherein the texture unit is configured to access a set of texture coordinates and a set of texture maps, where each texture coordinate of the set of texture coordinates can use any one texture map of the set of texture maps for a texture fetch.

13. A method for programming a shader of a graphics pipeline to implement programmable texture lookups from texture coordinate sets, comprising:
   specifying a plurality of texture coordinates for generation, the generation performed using a shader module, the shader module executing calculations on received pixel data to generate the texture coordinates; and
   fetching a plurality of texture values from a plurality of different textures by using the texture coordinates, the fetching performed by a texture unit coupled to receive the texture coordinates from the shader module, wherein the fetching of the texture values is programmable with respect to the texture coordinates, and wherein the texture unit is capable of implementing at least a 16-way texture fetch using at least 1 to 8 texture coordinates received from the shader module.

14. The method of claim 13, further comprising:
   specifying the texture accordance for generation, wherein the fetching of the texture values is decoupled from the receiving of the texture coordinates.

15. The method of claim 13, wherein the shader module and the texture unit are implemented within a programmable pixel shader.

16. The method of claim 13, further comprising:
   specifying a texture fetch that accesses a set of texture coordinates and a set of texture maps, where each texture coordinate of the set of texture coordinates can use any one texture map of the set of texture maps for the texture fetch.

17. An apparatus for implementing programmable texture lookups from texture coordinate sets, comprising:
   means for generating a plurality of texture coordinates using a shader module, the shader module executing calculations on received pixel data to generate the texture coordinates; and
   means for fetching a plurality of texture values from a plurality of different textures by using the texture coordinates, the texture coordinates received from a shader module, wherein the fetching of the texture values is programmable with respect to the texture coordinates, and wherein the means for fetching is capable of implementing at least a 16-way texture fetch using at least 1 to 8 texture coordinates received from the shader module.

18. The apparatus of claim 17, further comprising:
   means for using a texture unit to access a set of texture coordinates and a set of texture maps, where each texture coordinate of the set of texture coordinates can use any one texture map of the set of texture maps for a texture fetch.

19. The apparatus of claim 17, wherein a texture unit is capable of fetching the texture values using the texture coordinates, wherein the fetching of the texture values is decoupled from the receiving of the texture coordinates.

20. The apparatus of claim 17, wherein the shader module and a texture unit are implemented within a programmable pixel shader.

\* \* \* \* \*